United States Patent [19]

Hicks

[11] 4,316,451
[45] Feb. 23, 1982

[54] SOLAR ENERGY COLLECTOR

[76] Inventor: Versal C. Hicks, 501 Delavan Ave., Collinsville, Ill. 62234

[21] Appl. No.: 137,455

[22] Filed: Apr. 4, 1980

[51] Int. Cl.³ ............................................. F24J 3/02
[52] U.S. Cl. ............................... 126/440; 126/436
[58] Field of Search ............ 126/438, 439, 440, 400, 126/442, 436, 430, 450

[56] References Cited

U.S. PATENT DOCUMENTS

| | | | |
|---|---|---|---|
| 1,673,429 | 6/1928 | Vinson | 126/440 |
| 1,747,826 | 2/1930 | Gould | 126/442 |
| 3,387,602 | 6/1968 | Thomason | 126/432 |
| 3,815,574 | 6/1974 | Gaydos, Jr. | 126/436 |
| 4,106,485 | 8/1978 | Polley | 126/439 |
| 4,112,921 | 9/1978 | MacCracken | 126/448 |

*Primary Examiner*—James C. Yeung
*Attorney, Agent, or Firm*—Cohn, Powell & Hind

[57] ABSTRACT

This solar energy collector includes a base and an outwardly inclined collar having a mirror finish carried by the base. An energy absorbing pine tar substance for absorbing solar energy is carried by the base. Copper tubing arranged in a generally spiral pattern provides a heat exchange conduit located within the energy absorbing substance and fluid is passed through the pipes to absorb heat from the energy absorbing substance. A metallic ring is disposed on top of the pine tar and lenses are located above the metallic ring for focusing solar energy on the metallic ring and transferring heat to the pine tar.

4 Claims, 2 Drawing Figures

SOLAR ENERGY COLLECTOR

BACKGROUND OF THE INVENTION

This invention relates to a solar energy collector in general and particularly to a device that will collect solar energy regardless of the position of the sun above the horizon. The prior art discloses collectors which either are active, that is they physically track the sun across the sky, or are passive that is they are placed in an optimum position which may severely limit the amount of solar energy absorbed when the sun is close to the horizon.

SUMMARY OF THE INVENTION

This solar energy collector provides a device which passively tracks the sun. That is, although the collector is not physically moved, it actually absorbs solar energy as the sun changes above the horizon.

The solar energy collector includes a base and a collar having a mirror finish which is carried by the base and is angularly related to the base. An energy absorbing substance for absorbing solar energy is carried by the base and heat exchange conduit means are located within the energy absorbing substance for carrying a fluid which is passed through the conduit means for absorbing heat from the energy absorbing substance.

In one aspect of the invention, the heat exchange conduit means is copper tubing arranged in a generally spiral pattern. In another aspect, the energy absorbing substance is pine tar. In still another aspect, the base is substantially circular and the collar is outwardly inclined for reflecting solar energy on the pine tar.

In yet another aspect of the invention a metallic ring is operatively disposed on top of the pine tar and a plurality of lenses are located above the metallic ring for focusing solar energy on the metallic ring for heating the pine tar. In one aspect a pair of concentric circular hoops are carried by the base above the pine tar and the lenses are mounted between the hoops.

DESCRIPTION OF THE PREFERRED EMBODIMENT

Referring now by characters of reference to the drawings, it will be understood that the solar energy collector, indicated generally by 10, includes a base 11 which in the preferred embodiment is substantially circular. A collar 12 having a mirror finish on its inner face is carried by the base 11 and is angularly related thereto. The collar 12 is substantially annular and is outwardly inclined from the base 11 and in essence, the base 11 and collar 12 cooperate to form a bowl.

An energy absorbing substance, which in the preferred embodiment is provided by a shallow angle conical pad of pine tar 13, is carried by the base 11. While a variety of energy absorbing substances, such as asphalt could be utilized for this purpose, it has been found that pine tar is vastly superior in this particular application and conical configuration facilitates the collection of energy.

Figure 1:
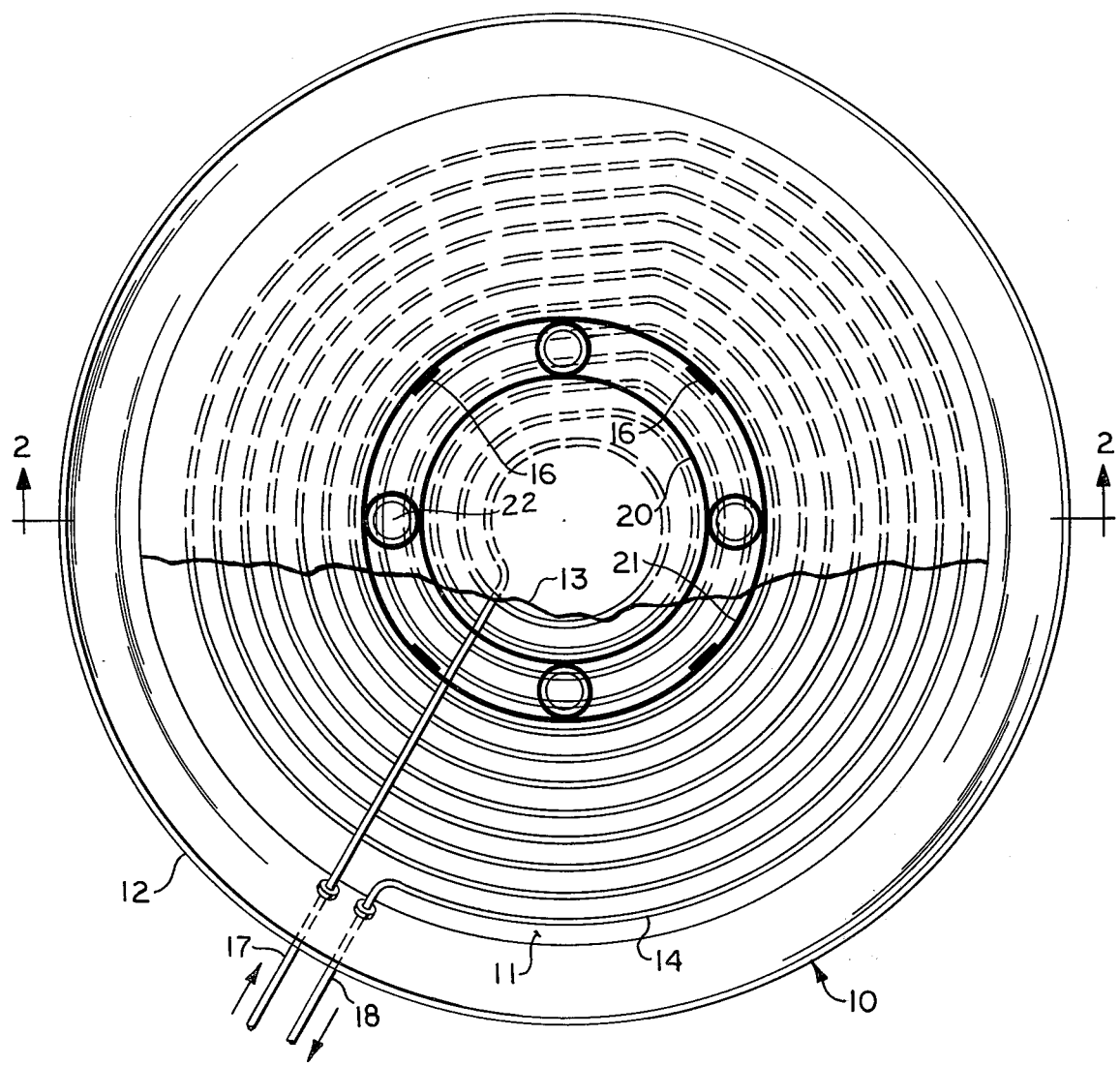
FIG. 1 is a top plan view of the solar energy collector shown partially in cross section.
Figure 2:
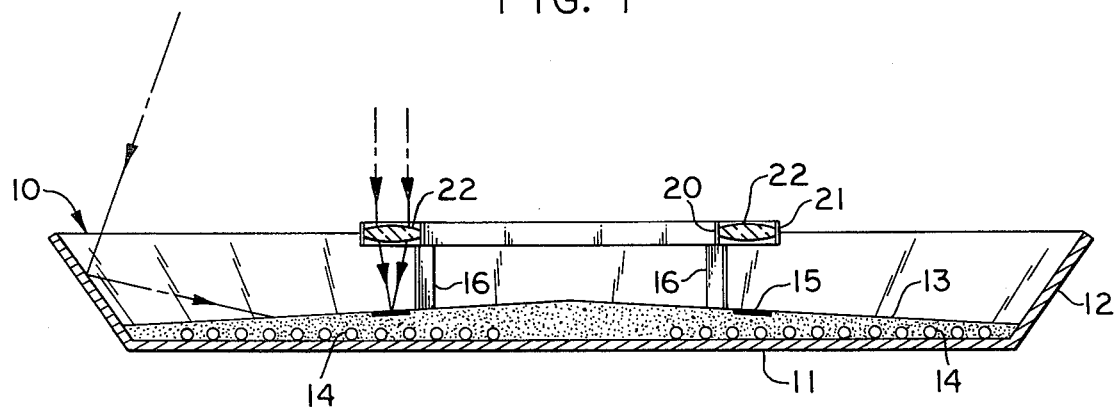
FIG. 2 is a sectional view taken on line 2—2 of FIG. 1.

Copper tubing 14, having a generally spiral pattern and constituting heat exchange conduit means, is located within the pine tar pad 13. As shown in FIG. 1, the tubing 14 extends through the collar 12 for remote connection at inlet and outlet points 17 and 18 respectively and a fluid such as water is passed through the tubing for absorbing heat from the pine tar 13. The heated water delivered at outlet 18 can be used in many applications which are well known in the solar energy and heat transfer art.

In the preferred embodiment, the solar energy collector 10 includes a metallic ring 15 which is operatively disposed on top of the pine tar pad 13. Legs 16 mounted on the base 11 carry a pair of concentric circular hoops 20 and 21 above the pine tar pad 13 and a plurality of lenses 22 are operatively mounted between said hoops. The lenses 22 are located above the metallic ring 15 for focusing solar energy on the metallic ring 15 for heating the pine tar 13.

It is thought that the structural features and functional advantages of this solar energy collector have become fully apparent from the foregoing description of parts, but for completeness of disclosure the operation of the device will be briefly discussed.

The solar energy collector is positioned so as to receive direct sunlight and solar energy is received by the pine tar pad 13 primarily in three different ways. First, sunlight directly strikes the pine tar pad 13 resulting in the absorbtion of solar energy by the pin tar. Second, sunlight is reflected from the mirror finish of the collar 12 and strikes the pine tar pad 13, this energy being additional to that received by the pine tar directly. Third, the lenses 22 focus sunlight onto the partially embedded ring 15, which also transfers heat to the pine tar, the ring 15 serving to distribute the concentrated heat received through said lenses.

As will be readily understood, the solar energy which has been absorbed by the pine tar pad 13 by each of the three sources can then be transferred through the copper tubing 14 to the fluid circulating within the copper tubing 14. The fluid carries the heat from the pine tar pad 13 to a remote location where the heat can be utilized, such use of circulating heated fluids being well known in the art.

I claim as my invention:

1. A solar energy collector comprising:
   (a) a base,
   (b) a collar carried by the base and angularly related thereto, the collar having a mirror finish,
   (c) an energy absorbing substance for absorbing solar energy carried by the base,
   (d) heat exchange conduit means located within the energy absorbing substance,
   (e) said conduit means receiving fluid passed through the conduit means for absorbing heat from the energy absorbing substance,
   (f) the energy absorbing substance being pine tar,
   (g) the pine tar being formed into a generally conical pad,
   (h) a metallic ring operatively disposed on top of the pine tar, and
   (i) a plurality of lenses located above the metallic ring for focusing solar energy on the metallic ring for heating the pine tar.

2. A solar energy collector as defined in claim 1, in which:
   (j) a pair of concentric circular hoops are carried by the base above the pine tar, and
   (k) the lenses are mounted between the hoops.

3. A solar energy collector comprising:
(a) a base,
(b) a collar carried by the base,
(c) an energy absorbing substance for absorbing solar energy carried by the base within the collar,
(d) heat exchange means located within the energy absorbing substance and receiving fluid passed through the heat exchange means for absorbing heat from the energy absorbing substance,
(e) a metallic ring operatively disposed on top of the energy absorbing substance, and
(f) a plurality of lenses located above the metallic ring for focusing solar energy on the metallic ring for heating the energy absorbing substance.

4. A solar energy collector as defined in claim 3, in which:
(g) the energy absorbing substance is pine tar.

* * * * *